US012691710B2

(12) United States Patent
Peri et al.

(10) Patent No.: US 12,691,710 B2
(45) Date of Patent: Jul. 28, 2026

(54) TIRE VALVE WITH A SECONDARY AIR RELEASE MECHANISM

(71) Applicants: Idan Peri, Beer Yaakov (IL); Dan Mordov, Nes Ziyyona (IL)

(72) Inventors: Idan Peri, Beer Yaakov (IL); Dan Mordov, Nes Ziyyona (IL)

( * ) Notice: Subject to any disclaimer, the term of this patent is extended or adjusted under 35 U.S.C. 154(b) by 0 days.

(21) Appl. No.: 19/004,505

(22) Filed: Dec. 30, 2024

(65) Prior Publication Data

US 2025/0375988 A1     Dec. 11, 2025

(30) Foreign Application Priority Data

Jun. 6, 2024    (IL) .......................................... 313435

(51) Int. Cl.
  *B60C 23/04* (2006.01)
  *B60C 23/00* (2006.01)
  *B60C 29/00* (2006.01)
(52) U.S. Cl.
  CPC ........ *B60C 23/0408* (2013.01); *B60C 23/001* (2013.01); *B60C 23/0486* (2013.01); *B60C 23/0488* (2013.01); *B60C 23/0494* (2013.01); *B60C 29/005* (2013.01)
(58) Field of Classification Search
  CPC ..... B60C 29/00; B60C 23/001; B60C 23/004; B60C 23/0408; B60C 23/0486; B60C 23/0488; B60C 23/0494; B60C 29/005
  See application file for complete search history.

(56) References Cited

U.S. PATENT DOCUMENTS

| 3,003,539 | A | * | 10/1961 | Tone | ..................... B60R 25/096 251/74 |
| 3,688,257 | A | * | 8/1972 | Mann | .................... B60R 25/096 152/450 |
| 4,375,200 | A | * | 3/1983 | Bertani | ................. B60R 25/096 116/33 |
| 4,818,029 | A | * | 4/1989 | Mourot | ................. B60R 25/096 152/415 |
| 4,825,925 | A | * | 5/1989 | Schultz | ............. B60C 23/00318 152/415 |
| 4,917,163 | A | * | 4/1990 | Schultz | ............. B60C 23/00372 152/415 |
| 4,969,342 | A | * | 11/1990 | Marchiori | ............. B60R 25/096 70/225 |
| 5,090,223 | A | * | 2/1992 | Ruffler | .................. B60R 25/096 70/225 |

(Continued)

FOREIGN PATENT DOCUMENTS

| CN | 2769131 Y | 4/2006 | |
| CN | 107310336 A | * 11/2017 | ......... B60C 23/0479 |

(Continued)

*Primary Examiner* — David Colon-Morales

(57) ABSTRACT

A tire valve that includes a valve stem, a valve core, and a secondary air release mechanism. The tire valve is designed to be assembled on a rim of a wheel of a vehicle for inflating and deflating a tire mounted on the rim. The secondary air release mechanism includes an electric air valve, a power source, an electronic card, and an antenna. The valve stem includes a tubular air passage and a secondary exit that is designed to enable air to flow from the tire, through the electric air valve when in open state and outside of the wheel through the tubular air passage and the secondary exit.

4 Claims, 2 Drawing Sheets

(56) References Cited

U.S. PATENT DOCUMENTS

| | | | | |
|---|---|---|---|---|
| 5,921,265 | A * | 7/1999 | Rothman | B60C 29/06 137/48 |
| 5,942,971 | A * | 8/1999 | Fauci | B60C 23/0423 340/447 |
| 6,005,480 | A * | 12/1999 | Banzhof | B60C 23/0494 340/447 |
| 6,068,076 | A * | 5/2000 | Stancliffe | B60R 25/1001 116/33 |
| 6,144,295 | A * | 11/2000 | Adams | B60C 23/00354 137/224 |
| 6,252,498 | B1 * | 6/2001 | Pashayan, Jr. | B60C 23/0408 340/447 |
| 6,296,010 | B1 * | 10/2001 | DeLauer | F16K 15/207 137/232 |
| 6,826,951 | B1 * | 12/2004 | Schuessler, Jr. | B60S 5/046 73/146 |
| 7,916,011 | B2 * | 3/2011 | Marguet | B60C 23/0408 340/447 |
| 8,146,413 | B1 * | 4/2012 | Grace | B60C 23/0496 73/146.8 |
| 8,336,667 | B2 * | 12/2012 | Tzarum | B60R 25/096 152/415 |
| 9,296,263 | B2 * | 3/2016 | Muthukumar | B60T 1/10 |
| 9,579,937 | B2 * | 2/2017 | Hennig | B60C 23/02 |
| 9,649,895 | B2 * | 5/2017 | McCormick | B60C 23/0408 |
| 9,821,766 | B2 * | 11/2017 | Gaskin | B60R 25/1001 |
| 10,052,920 | B2 * | 8/2018 | Kraayenbrink | B60C 23/00354 |
| 10,696,105 | B2 * | 6/2020 | Wu | B60C 23/0479 |
| 10,807,420 | B2 * | 10/2020 | Steele | B60C 23/0481 |
| 11,400,667 | B2 * | 8/2022 | Hong | B29C 73/166 |
| 11,524,532 | B2 * | 12/2022 | Stopczynski | B60C 23/002 |
| 11,535,069 | B2 * | 12/2022 | Jordan | B60C 23/006 |
| 11,685,201 | B2 * | 6/2023 | Musgrave | B60C 23/009 152/427 |
| 11,787,239 | B2 * | 10/2023 | Beverly | B60C 23/00354 152/417 |
| 11,845,308 | B2 * | 12/2023 | McGhee | F16K 15/18 |
| 12,179,520 | B2 * | 12/2024 | Coombs | B60C 23/00318 |
| 12,447,778 | B2 * | 10/2025 | Koppisetty | B60C 23/0488 |
| 2007/0137751 | A1 * | 6/2007 | Tsai | B60C 23/004 152/415 |
| 2009/0184814 | A1 * | 7/2009 | Lee | B60C 23/008 340/447 |
| 2011/0017317 | A1 * | 1/2011 | Pritschet | B60C 23/00363 137/223 |
| 2012/0203425 | A1 * | 8/2012 | Shibagaki | B60C 23/044 701/36 |
| 2016/0325593 | A1 * | 11/2016 | Austin | B60C 29/068 |
| 2021/0070118 | A1 * | 3/2021 | Markert | B60C 23/0494 |
| 2021/0129603 | A1 * | 5/2021 | Wijeysooriya | B60C 23/041 |
| 2024/0198736 | A1 * | 6/2024 | Richardson | B60C 23/004 |
| 2024/0198737 | A1 * | 6/2024 | Mungara | B60C 23/00354 |
| 2025/0229791 | A1 * | 7/2025 | Muthukumar | B60W 30/02 |

FOREIGN PATENT DOCUMENTS

| | | | | |
|---|---|---|---|---|
| CN | 110733300 | A * | 1/2020 | G08C 17/02 |
| EP | 2551130 | A1 * | 1/2013 | B60C 29/002 |
| ES | 2750821 | T3 * | 3/2020 | F16K 11/18 |
| GB | 2466203 | A * | 6/2010 | B60C 23/00372 |
| GB | 2539257 | A * | 12/2016 | B60C 23/04 |
| JP | 2005001579 | A | 1/2005 | |
| WO | WO-2012016178 | A1 * | 2/2012 | B60C 23/10 |
| WO | WO-2015115581 | A1 * | 8/2015 | B60C 23/0488 |
| WO | WO-2017127394 | A1 * | 7/2017 | B60C 23/00372 |

* cited by examiner

TIRE VALVE WITH A SECONDARY AIR RELEASE MECHANISM

RELATED APPLICATIONS

This application claims the benefit of priority of and Israeli patent application number 313435 filed on Jun. 6, 2024.

TECHNICAL FIELD

The present invention refers to a tire valve that includes a secondary air release mechanism and combined systems of the tire valve with a remote controller.

BACKGROUND ART

In many cases, it is necessary to deflate the vehicle's wheels, for example when driving off-road, and this is to create a better grip of the tires and also to soften the ride, because the tire is less compressed and softer when encountering rocks and potholes. Usually, a special key is used to remove the core of the valve, and after the tire reaches the required pressure, the core is returned with the key and locked, and this is currently considered the fastest way to deflates air from the wheels. The present invention comes to improve the way in which air is reduced in a faster and more convenient way.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

Figure 1:
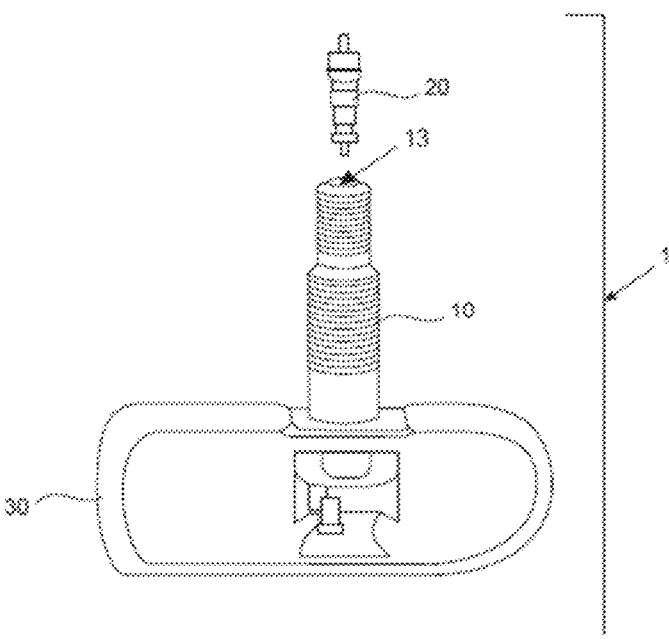
FIG. 1 is a schematic general depiction the tire valve (1) of the present invention.

The main objective of the present invention is to provide a tire valve (1) that includes a valve stem (10), a valve core (20), and a secondary air release mechanism (30). The tire valve is designed to be assembled on a rim (100) of a wheel (200) of a vehicle (300) for inflating and deflating a tire (400) that is mounted on the rim, in the normal ways and in addition to that to enable a fast air deflation through the secondary air release mechanism (30).

The secondary air release mechanism (30) includes an electric air valve (31), a power source (32), an electronic card (33), and an antenna (34). It is preferably that the electric air valve will be very small and even miniature. The are several kinds of electric air valves, for example, an electric air valves that when an electric current is applied to a solenoid, it generates a magnetic force that influences the position of a plunger, which is connected to a seal, and depending on the plunger's position within the valve body, the seal either opens or closes the valve orifices. In this disclosure and in the claims we will refer to these two states as an opened state and closed state. The electric air valve (31) includes an inlet opening (312) from which air can flow into the electric air valve and an outlet opening (311) from which air can flow outside the electric air valve. The electric air valve (30) operates on electric power, so the mechanism includes the power source (32), which can be a battery or a rechargeable battery that an internal energy harvester that produces electricity from the vehicle's wheel movement charges the battery. The electric air valve (31) is activated remotely by a signal sent to the antenna (34) that transmits the signal to the electric card (33) (which can be built-in inside the electric air valve), to open and close the electric air valve.

The valve stem (10) includes a tubular air passage (11) and a secondary exit (12) that is designed to enable air to flow from the tire (400), through the electric air valve (31) when in open state and outside of the wheel (201) through the tubular air passage (11) and the secondary exit (12). The air can flow from the outlet opening (311) to the inlet opening (111) of the tubular air passage (11). The valve stem (10) includes also the standard main air passage (14) and the standard main top opening (13) from which the air can flow outside the tire and from which possible to fill the tire with air. We would like to clarify that the normal operation of the tire valve, for example filling with air at a gas station, or emptying air by a key that changes a state in the core or takes it out is possible and remains the same. The special addition of the present invention is the secondary air release mechanism, the secondary exit (12) on the side wall of the stem, the tubular air passage inside the stem, and electric air valve of the mechanism, which enables a fast emptying of air from the wheel using the mechanism, through the secondary exit opening, according to a remote command sent as a signal to the antenna in the mechanism from a remote controller (500). In another embodiment, the tire valve (1) includes pressure sensor (35) so that the pressure in the wheel is known (to the electronic circuit or to the remote controller) and by that the remote controller can send a command to the mechanism to reduce the air pressure in the wheel to a certain air pressure and the tire valve (1) will act accordingly.

Another version of the present invention refers to a system (2) for releasing air from the tire (400) that is mounted on the wheel (200). The system (2) of this embodiment includes the tire valve (1) and the remote controller (500) that is configured to send a command to the tire valve to release air from the wheel. This version, mainly, is designed to enable the user to release air from the wheels according to the instructions he sends to the tire valves using the remote control (which could be, for example, his smartphone), and he can determine how much air to release (how much pressure to leave in the wheels). The control can be on each wheel separately, according to the identification numbers of the tire valves.

Another version of the present invention refers to a system (3) that includes the tire valve (1) and the remote controller (500). The system (3) of this embodiment is further includes a GPS unit (36) that can be positioned inside the tire valve (1), for example inside the mechanism (30), to be a part of the remote controller (500) (for example to use the built-in location of the smartphone), or separately. In this embodiment of system (3) the remote controller (500) is designed to send the signal to the antenna (34) of the tire valve (1) for operating the mechanism to be in an open state or a closed state according the location of the vehicle and the desired wheel pressure. The remote controller is configured to identify the location of the tire valve that represent the location of the vehicle by the GPS unit and to send the command to the tire valve to release air from the wheel upon the identified location of the vehicle. In this embodiment, when the remote controller identify that the vehicle is off-road (possible for a certain amount of time and/or distance from the road) then the remote controller sends a signal to deflate the tire to be in the desired pressure.

Another version of the present invention refers to a system (4) for releasing air from the tire of the wheel that is mounted on the vehicle in case of unauthorized use of the vehicle. This system (4) includes the tire valve (1) and the remote controller (500). The tire valve in this version is further includes a processor (37) with a unique identification code of the specific tire valve that is mounted on the wheel of the vehicle, and a displacement sensor (38) that is designed to detect movement of the vehicle (detect a movement of the sensor itself that represent a movement of the vehicle). The processor is configured to send an automatic opening command to open the electric air valve for releasing the air from the tire after a predetermined period from detection, by the displacement sensor, that the vehicle starts moving. Preferably that the processor may be further configured not to send this automatic opening command upon receiving a presence signal from the remote controller, that indicate a presence of the authorized user of the vehicle. To be clear, in this embodiment of system (4) the remote controller (500) is designed to send the signal to the antenna (34) of the tire valve (1) for operating the mechanism to be in an open state when detecting unauthorized use of the vehicle (the system is in fact an anti-theft system that deflates the wheels when the thief uses the vehicle). It is possible to use another types of sensors that their detection represent a use of the car.

The system (4) may further include the GPS unit (36) and the processor is further configured to send the automatic opening command to open the electric air valve for releasing the air from the tire after the predetermined period from detection, by the GPS unit, that the vehicle is located outside a predetermined territory a user set in the remote controller. In this version too, the processor may be further configured not to send the automatic opening command upon receiving the presence signal from the remote controller.

The processor may further is configured to send the automatic opening command to open the electric air valve for releasing the air from the tire after the predetermined period from a detection, by a timer in the processor, that the vehicle moves in with a period of time that the user set in the remote controller. The processor may be configured not to send this automatic opening command upon receiving the presence signal from the remote controller.

Another version of the present invention refers to a system (5) for releasing air from tires of the wheels of the vehicle that includes four tire valves 1A-1D (a first, second, third and fourth tire valves) that are respectively mounted on four wheels 200A-200D) of the vehicle (a first, second, third and fourth wheels) of a vehicle and the remote controller (500). Each tire valve is further includes the processor with the unique identification code of that specific tire valve, and a touch sensor (39) that is designed to detect a touch in the stem of the tire valve. The processors of the tire valves are configured to send an automatic opening command to open the electric air valves for releasing the air from the tires upon detection, by at least two of that four tire valves, a touch in the stems of the at least two tire valves and the processor may be configured not to send this automatic opening command upon receiving the presence signal from the remote controller.

The goal of this system (5) is to prevent thieves from trying to block the secondary exits (12) in order to prevent emptying the air from the wheels, therefore if within a short period of time (predefined) there is a touch in the stems of two tire valves (assuming that their secondary exists are already blocked) then there will be an immediate release of the air from the remaining other two wheels, before the thief will reach them to close their secondary exits, for example with glue.

Preferably, that the command to release the air in these systems is first sent as a message to the vehicle owner's registered mobile phone number, and only after he clicks on confirmation, then the command is carried out by the mechanism (this is to prevent a situation where there will be an accidental release of air while the owner or someone on his behalf is driving or using the vehicle or when the driver go off-road but without a need to release the pressure from the wheels).

Figure 2:
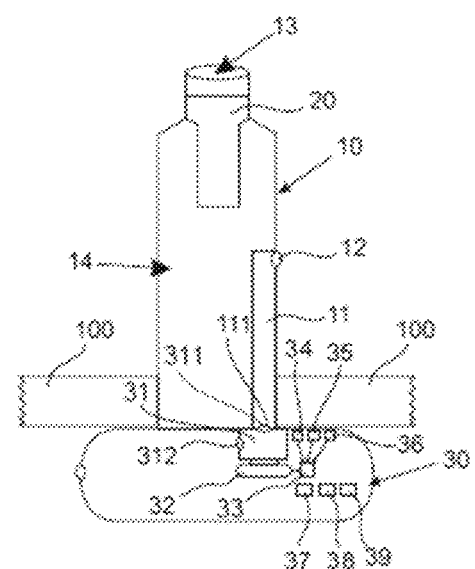
FIG. 2 is a cross-section schematic depiction the tire valve (1).
Figures 3, 4, 5A, 5B, 5C, 5D:
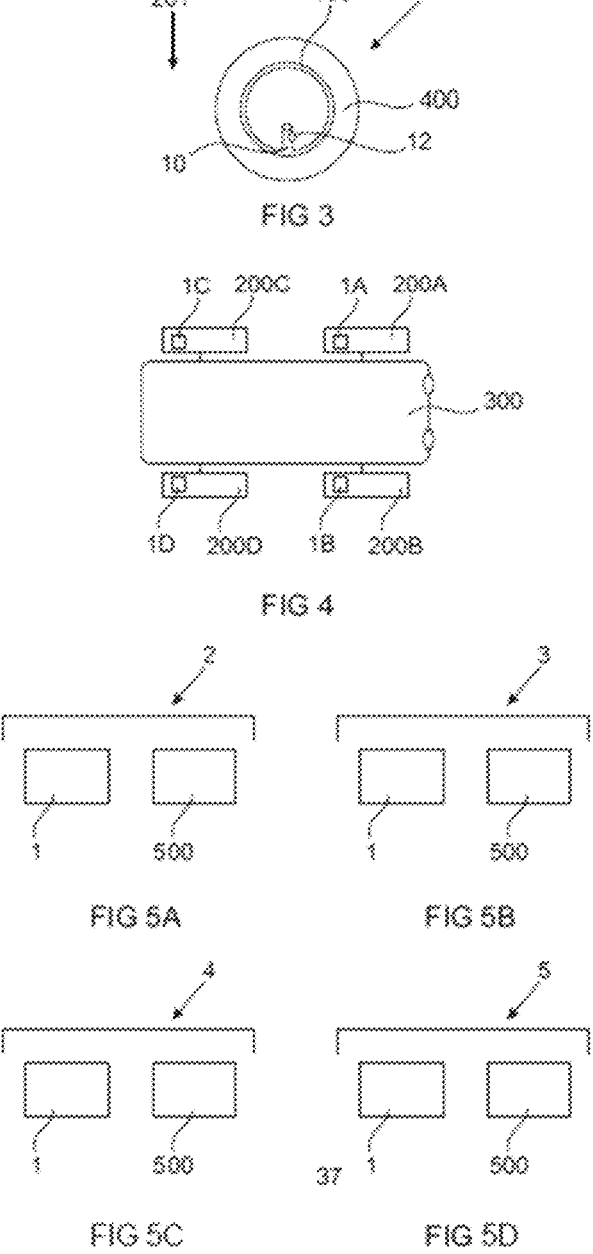
FIG. 3 is a schematic depiction of the wheel (200)
FIG. 4 is a schematic depiction of the vehicle (300) with four wheels.
FIGS. 5A-5D are schematic depictions of systems (2)-(5).

FIG. 1 is a schematic depiction the tire valve (1) of the present invention, FIG. 2 is a cross-section schematic depiction the tire valve (1), FIG. 3 is a schematic depiction of the wheel (200), FIG. 4 is a schematic depiction of the vehicle (300) with four wheels, and FIGS. 5A-5D are schematic depictions of systems (2)-(5).

What is claimed is:

1. A system for releasing air from a tire of a wheel mounted on a vehicle in case of unauthorized use of the vehicle that comprises a tire valve and a remote controller;
   wherein the tire valve comprising a valve stem, a valve core, and a secondary air release mechanism; wherein the tire valve is designed to be assembled on a rim of the wheel for inflating and deflating the tire mounted on the rim; wherein the secondary air release mechanism includes an electric air valve, a power source, an electronic card, and an antenna; wherein the valve stem includes a main air passage, a main top opening that are designed to enable a user to fill air into the tire or to release air from the tire through the valve core, and a secondary exit that is designed to enable air to flow from the tire through the electric air valve when in open state and outside of the wheel through the secondary exit;
   wherein the tire valve further includes a processor with a unique identification code of said tire valve that is mounted on the wheel of the vehicle, and a displacement sensor that is designed to detect movement of the vehicle;
   wherein the processor is configured to send an automatic opening command to open the electric air valve for releasing the air from the tire after a predetermined period from detection, by the displacement sensor, that the vehicle starts moving; and wherein the processor is configured not to send said automatic opening command upon receiving a presence signal from the remote controller.

2. The system of claim 1, that further comprises a GPS unit and wherein said processor is configured to send said automatic opening command to open said electric air valve for releasing the air from the tire after a predetermined period from detection, by the GPS unit, that the vehicle is located outside a predetermined territory the user set in said remote controller, and wherein the processor is configured not to send said automatic opening command upon receiving the presence signal from the remote controller.

3. The system of claim 1, that further comprises a GPS unit and wherein said processor is configured to send said automatic opening command to open said electric air valve <br>

5

6 for releasing the air from the tire after a predetermined period from detection, by a timer in the processor, that the vehicle moves in certain time that the user set in said remote controller, and wherein the processor is configured not to send said automatic opening command upon receiving the presence signal from the remote controller.

4. A system for releasing air from tires of wheels of a vehicle that comprises a first, second, third and fourth tire valves respectively mounted on a first, second, third and fourth wheels of the vehicle and a remote controller;

wherein each tire valve comprising a valve stem, a valve core, and a secondary air release mechanism; wherein each tire valve is designed to be assembled on a rim of a respective wheel for inflating and deflating a respective tire mounted on the rim; wherein the secondary air release mechanism includes an electric air valve, a power source, an electronic card, and an antenna; wherein the valve stem includes a main air passage, a main top opening that are designed to enable a user to fill air into the respective tire or to release air from the respective tire through the valve core, and a secondary exit that is designed to enable air to flow from the respective tire through the electric air valve when in open state and outside of the respective wheel through the secondary exit;

wherein each tire valve further includes a processor with a unique identification code of the tire valve, and a touch sensor that is designed to detect a touch on the stem of said tire valve; and wherein the processors of the tire valves are configured to send an automatic opening command to open the electric air valves for releasing the air from the tires upon detection, by at least two of said four tire valves, the touch on the stems of said at least two tire valves and wherein the processor is configured not to send said automatic opening command upon receiving a presence signal from the remote controller.

* * * * *